United States Patent
Pouey

[11] 3,973,850
[45] Aug. 10, 1976

[54] FOCALIZATION PROCESS OF SPHERICAL CONCAVE DIFFRACTION GRATINGS

[75] Inventor: Michel Pouey, Vanves, France

[73] Assignee: Agence Nationale de Valorisation de la Recherche (ANVAR), Neuilly, France

[22] Filed: Aug. 16, 1974

[21] Appl. No.: 497,940

Related U.S. Application Data

[63] Continuation-in-part of Ser. No. 277,857, Aug. 4, 1972.

[30] Foreign Application Priority Data

Apr. 21, 1972  France .............................. 72.14214

[52] U.S. Cl. ................................. 356/100; 350/3.5; 350/162 R; 356/79

[51] Int. Cl.² ...................... G01J 3/12; G03H 1/04; G02B 5/32

[58] Field of Search ................. 350/162 R, 3.5, 168; 356/79, 100, 101

[56] References Cited
UNITED STATES PATENTS

| | | | |
|---|---|---|---|
| 3,578,845 | 5/1971 | Brooks et al. ......................... | 350/3.5 |
| 3,628,849 | 12/1971 | Flamand et al. ....................... | 356/79 |

OTHER PUBLICATIONS

Meltzer, "Spectrographs and Monochomators", Chapter 3 of Applied Optics and Optical Engineering, vol. 5, Edited by Kingslake, Academic Press, New York, 1969, pp. 63–66, 80–81 relied upon.

Speer et al., Applied Optics, vol. 13, No. 6, June 1974, pp. 1258–1261.

Murty et al., Journal of the Optical Society of America, vol. 61, No. 8, Aug. 1971, pp. 1001–1006.

Cordelle et al., Optical Instruments and Techniques 1969, Edited by Dickson, 1970, Oriel Press, pp. 117–124.

*Primary Examiner*—Ronald J. Stern
*Attorney, Agent, or Firm*—Baldwin, Wight & Brown

[57] ABSTRACT

Spectrometric gratings formed by holographic techniques are disclosed. The gratings are employed in monochromator mounts of the type in which fixed entrance and exit slits are combined with simple rotation of the grating to scan the spectral range of interest, the angles of incidence and diffraction and the positions of the slits being so related that the mounts are characterized by improved optical performance due to phase balancing and improved focussing properties according both to geometrical and diffraction theories. The parameters involved in the holographic formation of the gratings, specifically the angularities and positions of the point sources forming the holographic image of the grating lines, are specifically related to the characteristics of the mount as to improve further their optical characteristics, particularly with respect to mounts either employing "normal" (i.e., relatively small) angles of incidence with large grating apertures or employing grazing incidence (i.e., for use in the far ultraviolet region).

14 Claims, 1 Drawing Figure

FOCALIZATION PROCESS OF SPHERICAL CONCAVE DIFFRACTION GRATINGS

This application is a continuation-in-part of my co-pending application Ser. No. 277,857 filed Aug. 4, 1972 and now replaced by application Ser. No. 537,460.

BACKGROUND OF THE INVENTION

In my copending application Ser. No. 277,857, filed Aug. 4, 1972 there is disclosed structure and method relating to spectrography and, more particularly to monochromators employing concave diffraction gratings with fixed entrance and exit slits in which the spectral range of interest is scanned by means of grating rotation. Such application, then, relates to reflective diffraction grating mountings generally similar to the Seya mounting but in contrast thereto being free of the fixed or specific angular constraint which characterizes the Seya mounting and yielding substantially improved optical performance. In fact, said application discloses means by which the angles of incidence and diffraction may be chosen at will to fit the needs and peculiarities of a particular problem. Such a system leads to the capability of providing plural entrance and exit slits, all fixed. The mechanical advantages of such systems are substantial particularly as regards general simplicity and economy resulting therefrom.

However, there are also significant optical advantages which flow from the systems of said application, chief among which are increased resolution and luminosity. Basically, the mountings of said application are characterized by the fact that the sum of the object and image tangential focal length equations is not equated to zero but rather to a value $e$ which is determined as a function of the aberrations produced by the concave grating over the rectangular aperture provided by the ruled area of the grating. The aforesaid application, then, relates to focalization which takes the aberrations into account. Specifically, a change of reference sphere at the exit slit is effected which allows a grating of large width $W_o$ to be used (where W and H represent the retangular coordinates from the center of the grating respectively, perpendicular and parallel to the grating lines), in particular wherein the partial derivative of the optical path length P with respect to W is zero, i.e., the total optical path is stationary with respect to W (Fermat's principle).

For spectrometers in which the aberrations are small (i.e. with normal incidence), a computation based upon Strehl's criterion links the image broadening (and therefore the resolution loss) to the amplitudes of the aberrations. For spectrometers in which the aberrations are large (i.e. grazing incidence), the computation is based upon a quality factor characterizing the trace of light rays located in the image plane, weighted by intensity distribution.

The diffraction of the incident spherical wavefront at the rectangular aperture provided by the ruled grating width $W_o$ and height $H_o$ (the width being taken perpendicular to the grating lines) creates a distorted wavefront at the image plane. The difference $\Delta(w,h)$ between the distorted wavefront and the reference sphere centered on the Gaussian image is very much greater than the difference $\Delta'(w,h)$ between the distorted wavefront and a reference sphere centered on the brightest part of a line at best focus. The change of reference spheres (change of focus) involves a linear term $C_1 W$ and a quadratic term $C_2 W^2$ relating the two functions $\Delta(w,h)$ and $\Delta'(w,h)$ as follows:

$$\Delta'(w,h) = \Delta(w,h) + C_1 W + C_2(w^2 + h^2)$$

Two cases must be distinguished:

I. For monochromator mountings in which the deviation of $\Delta(w,h)$ over the exit pupil is small with respect to the wavelength $\lambda$, (i.e. $2\pi\Delta(w,h)/\lambda \ll 1$) the ruled area of grating for a given height $H_o$ thereof and to derive values of $C_1$ and $C_2$. These values $C_1$ and $C_2$ are then introduced into the grating equation derived from Fermat's principle to obtain a generalized focusing equation in which the main aberration terms (except for astigmatism) are balanced by the defocusing term.

II. For monocromator mountings in which the deviation $\alpha(w,h)$ is large ($2\pi\alpha(w,h) \gg 1$) the values of $C_1$ and $C_2$ in function of the following:

$$\frac{1}{W_o H_o} \int_{\frac{-W_o}{2}}^{\frac{W_o}{2}} \int_{\frac{-H_o}{2}}^{\frac{H_o}{2}} \left( \frac{\delta\Delta'}{\delta w} + \frac{\delta\Delta'}{\delta h} \right)^2 dw\, dh \leq \frac{K^2 W_o^2 <\delta\lambda>^2}{\cos^2\beta} = Q^2$$

given as equation (1) in my copending application; which requires an initial selection of $W_o$ and $H_o$ and from which $Q$ and consequently the luminosity are deduced.

The case I condition is encountered for in plane mountings operating at "normal" incidence and moderate values of $W_o$ whereas the case II condition is encountered when the aforesaid in plane mountings are required to operate at very high luminosity, requiring large values of $W_o$ (i.e. mountings operating in the VUV region), and for mountings where grazing incidence is used (i.e. operating in the XUV region). It should be noted that whereas for case II the values $W_o$ and $H_o$ are determined at the beginning in order to determine the quality factor and consequently the luminosity, for case I the values $W_o$ and $H_o$ are not chosen initially, being determined on the basis of equation (11) of my copending application. In other words, considering the fundamental focalization equation:

$$\frac{\cos^2\alpha}{e} + \frac{\cos^2\beta}{e'} = H(\lambda)$$

where for case II:

$$H(\lambda) = \cos\alpha + \cos\beta + RW_o^2 \left[ \frac{6}{5}(C_4 + C_{04}) + \frac{1}{3}(C_{22} + 2C_4)\rho^2 \right]$$

and for case I:

$$H(\lambda) = \cos\alpha + \cos\beta + \frac{RW_o^2}{2} \left[ \frac{6}{7}(C_4 + C_{04}) + \frac{1}{3}(C_{22} + 2C_4)\rho^2 \right]$$

the values $W_o$ and $H_o$ for case II are determined from the following, based upon Strehl's criterion:

$$AW_o^8 + BW_o^6 \leq \frac{\lambda^2}{\pi}$$

$$A = \frac{C_2^2}{2205} + \frac{(C_{22} + 2C_4)^2 \rho^2}{1620}; \quad B = \frac{C_{04}^2}{140}$$

whereas for case I $W_o$ and $H_o$ are established initially in consequence of which the quality factor $Q$ and consequently the luminosity are deduced.

In each case, the procedure leads to a residual instrument defocusing the tolerance for which is established in a manner similar to that involved with the depth of focus of conventional optical systems.

That is to say, the mounts according to my copending application are characterised by a residual deviation, the tolerance for which is determined in a manner equivalent to the manner in which the tolerance for depth of focus in classical optical system is determined. Thus, for the case of large aberrations where the quality factor Q is used, one employs the practical limiting resolving power $R_p = \lambda/\langle\delta\lambda\rangle$ where $\langle\delta\lambda\rangle$ is the limiting resolution and the "instrumental defocusing power"
$\overline{P} = \lambda/\delta\lambda \text{inst}$
where $\delta\lambda$inst is the defect of residual instrumental setting corresponding to the aforesaid residual deviation such that a limiting value $$\lambda/t = \frac{\cos\beta}{2\sqrt{3}} R_p$$

is determined, $t$ being the tolerated depth of focus for the mount equivalent to the tolerable depth of focus employed in classical optical systems. Then
$\delta\lambda < t = 1.54\delta\lambda_t$
For low aberrations where Strehl's criterion is used and the practical limiting resolving power $R_p$ equals $0.8NW_oK$, p must satisfy the condition:

$$p \frac{R_p}{1.54} = \frac{KNWo}{1.92}$$

where $\overline{p}$ in this case equals $\lambda/\delta\lambda t$ and $\delta\lambda\text{inst} \leq t = 1.54\delta\lambda t$ with $\delta\lambda_t = \lambda(0.8NKW_o)^{-1}$.

Holographic gratings are now available which are efficient in the near and far ultraviolet spectral range and which are produced by photographically recording interference fringes. The development of photochemical processes has enabled such gratings to be obtained with small amounts of diffused light and a high efficiency. Said method of making of gratings has been found to be very flexible since it is possible to control, or to have an action on a plurality of parameters; i.e., the position of the sources which are used to record the grating; the shape of the support for the grating; the shape of the interfering waves.

In acting on these various parameters, it is possible to produce concave gratings with a very large aperture by using a spherical support of large curvature. Moreover, by acting on the position of the sources, certain writers have indicated the possibility of correcting astigmatism. This point is very important especially in the far ultraviolet range where the losses in intensity due to astigmatism are very high.

Prior to the present invention, it was well known that no satisfactory solution to the focusing problem for such gratings existed, compensation for astigmatism resulting in a substantial increase in other aberrations. The only solution which could be envisaged in the case of a mounting with simple rotation of the grating about an axis passing through its top and parallel to the grating lines was a Seya-Namioka type solution for which the angle between the two beams is about 70°15. Even in this case, the aberrations are greater in the case of such gratings than in classical gratings. From the practical point of view these gratings could have a great advantage by obtaining extensive ruled surfaces with a high number of lines per millimeter by using the general focusing principles described in my copending application. It is to be recalled that contrary to generally accepted focusing principles, my copending application considers that the equations of Fermat's principle must be satisfied as a whole, that is, the first term must not merely be considered zero, but on the contrary, the sum of the terms must be cancelled. In other words, instead of considering the sum $T + T'$ of the equations of the object and image tangential focal lengths as zero which brings about an evaluation of aberrations with respect to an image point corresponding to the limiting case of a zero aperture, a phase compensation method is used by displacement of the reference sphere and the aberrations are evaluated with respect to the brightest point of the image. Owing to the generally high value of the coefficients of aberration, and thus on account of the high value of the ruled surface particularly in the case of holographic gratings, the amplitudes of the aberrations vary rapidly with the position of the reference image plane, i.e., the plane wherefrom one observes the structure of the image of the object slot given by the grating. Further, although it is conventional to employ a purely mathematical method of the function $f = T + T'$ so as to obtain the parameters necessary for solving the equation $T + T' = 0$ in the case of a particular mounting, a more physical method is disclosed in my copending application. Namely, in order for image formation to take place, the derivative of the optical path must be zero, whereby the equations which are derived from this principle must be satisfied regardless of wavelength. It is therefore necessary to consider the focusing relationship of the second order, i.e. that which takes into account a compensation of the aberrations by an appropriate selection of the image plane, which best satisfies the spectral range of utilisation.

BRIEF SUMMARY OF THE INVENTION

The present invention is concerned with improvements relating to spectrometers constructed according to the principles of the aforesaid application and, in particular, to means by which the gratings of such spectrometers are formed by holographic techniques in order to improve the performance of such spectrometers still further.

Generally speaking, the improvement according to this invention involves linking the parameters employed for forming a grating by holography to the characteristics of the particular spectrometer having fixed entrance and exit slits and in which the spectral range of interest is scanned by rotating the grating.

In particular, the present invention involves controlling the holographic formation of the grating in such a way that astigmatic correction or overcorrection is effected. This is very important especially in the far ultraviolet range where losses in intensity due to astigmatism are very high.

Further, this invention involves a system wherein the four parameters involved in the holographic formation of the grating (i.e. the positions and angles of the interfering sources) may be employed not only to compensate for astigmatism but also to minimize other aberrations as well.

Still further, the present invention provides for the introduction of further parameters related to the sources used for forming the holographic grating, specifically by providing an astigmatic source or sources to provide a total of five or six parameters whereby the optical state of correction may be improved even further. This technique is especially useful in conjunction with aspheric gratings and in particular with toroidal gratings.

DETAILED DESCRIPTION OF THE INVENTION

Figure 1:
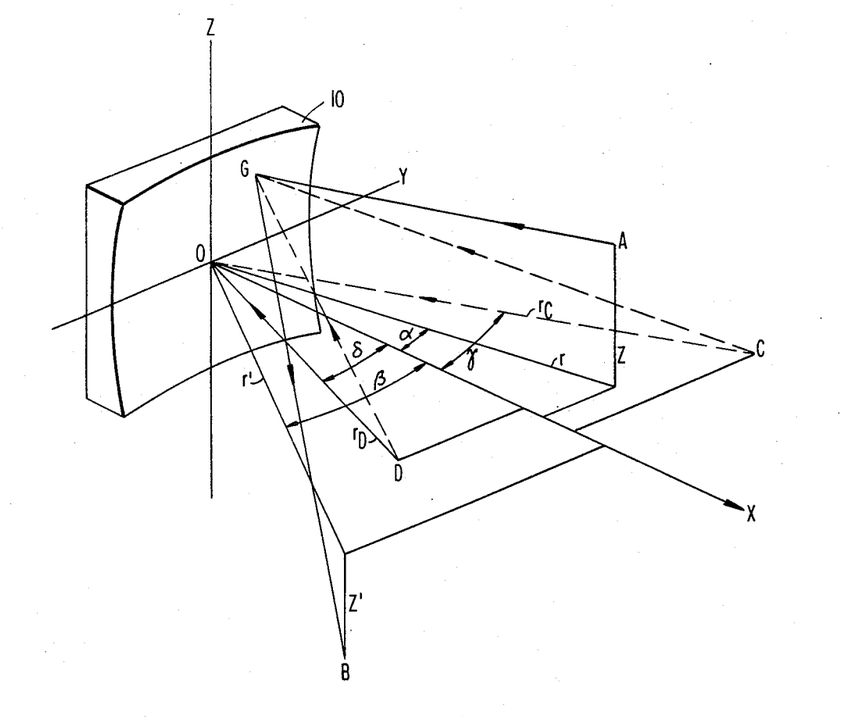
FIG 1 is a view illustrating the concepts of this invention.

In FIG. 1, reference character 10 indicates the reflective diffraction grating which as shown is of the concave type. Considering the origin 0 at the center of the grating, the Cartesian coordinate system $x$, $y$ and $z$ is set up as shown. If A $(x,y,z)$ and B $(x',y',z')$ are a point in the entrance slit and the image of this point in the exit slit respectively, if C $(x'',y'',z'')$ and D $(x''',y''', z''')$ are the positions of the light sources for producing the grating by holography, and with the point G(U,W,L) being a point of the grating on the nth groove from the origin, then for the ray AGB the optical path P has the value:

$$P = \overline{AG} + \overline{GB} + mn\lambda \qquad (1)$$

$m$ being the order of diffraction, $n$ the reciprocal of the grating line spacing $\sigma = 1/n$, and $\lambda$ the wavelength.

However, because the grating is produced by interference created by the two point sources C and D, the value of n is not constant as in classical gratings but is determined by the relationship:

$$n\lambda_o = (\overline{CG} - \overline{DG}) \cdot (\overline{CO} - \overline{DO}) \qquad (2)$$

where $\lambda_o$ is the wavelength for recording the grating, i.e., the wavelength at the point sources at C and D.

If one considers the optical path in the form:

$$P = F_1 + F_2 \qquad (3)$$

where $F_1$ is the optical path associated with a classical grating whereas $F_2$ is the optical path contribution due to holographic formation of the grating, the following equations must be satisfied to ensure image formation according to Fermat's principle:

$$\frac{\partial P}{\partial w} = \frac{\partial F_1}{\partial w} + \frac{\partial F_2}{\partial w} \qquad (4)$$

$$\frac{\partial P}{\partial h} = \frac{\partial F_1}{\partial h} + \frac{\partial F_2}{\partial h} \qquad (5)$$

To record the grating the distance $\overline{CO} = R_c$ and the corresponding angle OX,OC $= \gamma$ as well as the distance $\overline{DO} = r_d$ and the corresponding angle OX,OD $= \eta$ must be known. Thus, there are four parameters available for satisfying equations (4) and (5). Since there is a first relationship among the angles $\gamma$ and $\eta$ and the wavelength $\lambda_o$ determining the constructive interference phenomenon on the reflective surface being considered, the invention in general involves setting up the three remaining relationships necessary to determine the value of the parameters $r_c$, $r_d$, $\gamma$ and $\eta$ such that equations (4) and (5) are satisfied.

With the mounting constructed in accord with the disclosure of my copending application Ser. No. 277,857 the term $$\frac{\partial F_1}{\partial w},$$

is equal to zero. Therefore, the second relationship determining the parameters necessary to satisfy equation (4), is that $$\frac{\partial F_2}{\partial w} = 0.$$

In view of the additive property of aberrant optical paths, this second relationship establishes a condition identical to $T + T' = e$ as previously described, and is the form:

$$\cos \gamma - \cos \eta = \Phi(\rho_c, \rho_d, \gamma, \eta) \qquad (6)$$

were $\rho_c = R_H/r_c$ in which $R_H$ is the radius of curvature in the horizontal plane $x$, $y$ and where $$\rho d = \frac{RH}{r_d}.$$

The effect of cancelling the first order terms in equation (5) so that $$\frac{\partial P}{\partial h} = 0$$

is to establish the condition:

$$\cos\lambda - \cos\eta = \rho'c - \rho'd + \frac{\lambda_o}{m\lambda}\Omega(\rho,\rho',\alpha,\beta) \qquad (7)$$

where $$\rho'c = \frac{R_V}{r_c} \; ; \; \rho'd = \frac{R_V}{r_d},$$

with $R_V$ being the radius of curvature in the vertical plane $x,z$.

From equations (6) and (7), the generalized second relationship is established, as follows:

$$\Phi' = \lambda_o f(\lambda) \qquad (8)$$

The practical conclusions which result from equation (8) are very important. If $f(\lambda)$ can be made constant over the spectral range of interest, the positions of the light point sources used to record the grating will be independent of the wavelenth of use and the mounting can be optically corrected perfectly with respect to astigmatism as well as with respect to other aberrations of an even order. Accordingly, mounts of my copending application may be improved optically by selecting among them those which satisfy the condition $f(\lambda) = qn$, $q$ being a constant independent of the wavelength over the wide spectral range of interest. Specifically, for mountings having "normal" incidence (i.e. those having the angle $2\theta$ between the incident and diffracted beams less than 70°) there are, for a given grating and a given ruled surface area, angles $\theta_n$ such that $$f(\lambda) - qn \leq 2p$$

$p$ being the precision of positioning of the point sources (depth of field of the lenses used to form two point sources from an optical laser beam).

In such cases, the two remaining parameters can be used to cancel the two principal coma terms, either for the same wavelength, or for two different wavelengths.

In cases where the function $f(\lambda)$ of equation (8) varies substantially with $\lambda$, (i.e., for mounts used with grazing incidence correction of astigmatism for two wavelengths may be employed by satisfying equation (7) for two wavelengths $\lambda_i$ and $\lambda_f$, which in particular can be those used to solve the equation $T + T' = e$, in which case equation (7) is of the form:

$$\cos\gamma - \cos\eta = \rho'_c - \rho'_d + q'n\lambda_o \qquad (7')$$

The coefficient $q'$ is dependent only on $\lambda_i$ and $\lambda_f$ (and therefore on $\alpha$ and $\beta$ and on $n$ related to the mounting being considered).

Thus, when the aberrations are large, the second condition to be satisfied will be of the form $\Omega' = q'n\lambda_o$. The two other conditions necessary for determining the positioning parameters of the recording points may be the same as in the preceding case, i.e., those corresponding to the cancellation of the two principal coma terms.

Following the general procedures outlined above, the parameters determining the positions of the two point sources at C and D are established so that the grating thus obtained may be used to make high resolution, high luminosity stigmatic dispersive devices.

This general procedure leads to substantial economic benefit. Indeed, without this method it is necessary to have recourse to quasi random trials by computer which are costly owing to the number of parameters to be studied, and which are very time consuming and despite which the probability of finding suitable results is so small that the methods described in my copending application could not be used. Thus, by reducing the cost of calculation according to the principles herein, provision of holographic gratings at lower production costs and which moreover are perfectly adapted from the optical point of view to the mountings for which they are intended is possible. In addition, the present invention leads to the possibility of producing mountings employing holographic gratings formed on any support whatsoever, the deformations of the wave surface after diffraction by said holographic gratings being minimized by the use of the phase correction method and the use of image quality criteria described in said copending application.

By way of a non limiting example one may consider the case of a concave spherical surface upon which the grating is formed, and more particularly the case of "in plane" mountings with simple rotation of the grating about an axis passing through its top. As is disclosed in my copending application, it is possible to obtain mountings with high brightness and resolution, with fixed object and image distances. If R is the radius of curvature of the grating having an optimum ruled width $W_o$ and a ruled height $H_o = \rho W_o$, it was shown that for each value of the angle $2\theta$ formed by the incident and diffracted beams, there is a value $r = Re$ of the object distance and a value $r' = Re'$ of the image distance, such that $\delta F_1/\delta w$ may be considered as zero in the spectra range under consideration.

By assuming that the difference between the distances C and D to 0 is a whole number multiple of the recording wavelength $\lambda_o$ and by substituting equations (2) and (1), after series expansion the literal value of P is obtained. During a first step the Gaussian image plane is determined, i.e., the plane corresponding to a very slight aperture (i.e., $W_o$ and $H_o \rightarrow 0$) and from equation (4) one obtains the basic equation of the grating:

$$\frac{\lambda_o(\sin\alpha + \sin\beta)}{\sin\eta - \sin\lambda} \left(1 - \frac{h^2}{2r^2}\right) = m\lambda \qquad (9)$$

$\alpha$ and $\beta$ being the angles of incidence and diffraction and $h$ the level of the point object located in the vertical plane of the entrance slit. If the nominal or actual interline spacing of the grating is:

$$\sigma = \frac{1}{n} = \frac{\lambda_o}{\sin\eta - \sin\gamma},$$

the first condition to be respected is therefore:

$$\sin\eta - \sin\gamma = n\lambda o \qquad (10)$$

The focusing equation $$\frac{\partial P'}{\partial w} = 0$$

of the first order:

$$\frac{\cos^2\alpha}{e} + \frac{\cos^2\beta}{e'} - \frac{m\lambda}{\lambda_o}(\rho_c\cos^2\gamma - \rho_d\cos^2\eta) = H_o' \qquad (11)$$

where:

$$H_a' = \cos\alpha + \cos\beta + \frac{m\lambda}{\lambda_o}(\cos\gamma - \cos\eta)$$

$$\rho_c = \frac{R}{r_c} = \frac{1}{e_c}$$

$$\rho_d = \frac{R}{r_d} = \frac{1}{e_d}$$

constitutes the second condition generally considered.

The total aberrant optical path $\Delta_t(w,h)$ determined with respect to the Gaussian image plane defined by the first order equation (11) is in the form:

$$\Delta_t(w,h) = \Delta(w,h) + \Delta_h(w,h)$$

in which $\Delta(w,h)$ is the aberrant optical path associated with the mounting and $\Delta_h(w,h)$ is the aberrant optical path associated with the formation of the grating.

As disclosed in my copending application, the terms $C_1W$ and $C_2W^2$ relating to the displacement of the reference sphere from the Gaussian image plane are determined from the aberrant optical path $\Delta(w,h)$.

The corrected aberrant optical path $\Delta'(w,h)$ is then expressed:

$$\Delta'(w,h) = C_1W + C_2W^2 + \Delta_H(w,h) \tag{12}$$

or if the mounting is illuminated with a source having a particular characteristic (as for example a Doppler effect source as described in my copending application), the more generalized form of equation (12) is obtained:

$$\Delta'(w,h) = C_1W^2 + C_1\ W + C_2\ W^2 + \Delta_h(w,hh) \tag{12'}$$

If the position of the point sources C and D are chosen when forming the grating such that the aberrant optical path $\Delta_h$ is minimized, the corrected aberrant optical path $\Delta'_h$ is defined as:

$$\Delta'_h = D_1W - D_2W^2 + \Delta_p(w,h) \tag{13}$$

The coefficients $C_1$, $C_2$, $D_1$ and $D_2$ may be obtained in the case of small total corrected aberrant optical path ($\Delta'_t \ll \lambda$) by the image quality criterion (Strehl's criterion) or in the case of large aberrations by the quality factor $Q$, both as disclosed in my copending application.

From equations (11), (12) and (13), the total corrected aberrant optical path $\Delta'_t$ is defined as:

$$\Delta'_t(w,h) = \Delta'(w,h) + \Delta'_h(w,h) = \Delta'_p(w,hh) + \Delta'_i(w,hh) \tag{14}$$

where $\Delta'_i$ represents the odd aberrant terms, i.e.;

$$\Delta'_i = C_1W + C_1^=\ W + C_{01}W + C_{03}W^3 + C_{21}H^2W + D_1W + D_{03}W^3 + D_{21}H^2W$$

and $\Delta'_p$ represents the even terms, i.e.:

$$\Delta'_p = C_2W^2 + C_2\ W^2 + C_{02}W^2 + C_{22}W^2H^2 + C_{04}W^4 + C_4H^4 + D_{02}W^2 + D_{22}W^2H^2 + D_{04}W^4 + D_4H^4$$

the coefficients $C_{01}$, $C_{03}$ and $C_{21}$ and $C_{02}$, $C_{22}$, $C_4$ and $C_{04}$ being the aberration coefficients of the grating and the coefficients $D_{03}$ and $D_{21}$ and $D_{22}$, $D_{04}$ and $D_4$ being aberration coefficients associated with the positions of the point sources $C$ and $D$ when forming the grating.

As described in my copending application, the coefficients $C_1$ and $C_2$ and similarly $D_1$ and $D_2$ may be obtained from the image quality criteria (Strehl criterion if $\Delta'_t(w,hh) \ll \lambda$, or the quality factor $Q$ in the other case). As, in practice, the interest in holographic gratings resides in the possibility of making wide open mountings for the far ultraviolet range, there will now be considered by way of non limiting example, the particular case of strong aberrations.

Based upon the generalized quality factor $Q$, the focusing equation:

$$\frac{\partial P}{\partial w} = \frac{\partial F1}{\partial w} + \frac{\partial F2}{\partial w} = 0 \tag{15}$$

can be expressed:

$$\frac{\cos^2\alpha}{e} + \frac{\cos^2\beta}{e'} + \frac{m\lambda}{\lambda_o}(\rho_c\cos^2\gamma - \rho_d\cos^2\eta) = \cos\beta + \cos\beta + \frac{m\lambda}{\lambda_o}(\cos\gamma - \cos\eta) + \frac{RW_o^2}{2}\left[\frac{6}{5}X' + \frac{V'}{3}\rho^2\right] + 2C_{02} + 2C_2^* \tag{16}$$

where
$x' + x + xe$
$x + C_{04} + C_4;\ X_e = D_{04} + D_4$
$V' = V + V_e$
$V + C_{22} + 2C_4;\ V_e = D_{22} + 2D_4$ Since in mountings of my aforesaid application are characterized by the relation $\delta F_1/\delta w = 0$, equation (16) reduces to:

$$\frac{m\lambda}{\lambda_o}(\rho_c\cos^2\gamma - \rho_d\cos^2\eta) = \frac{m\lambda}{\lambda_o}(\cos\gamma - \cos\eta) + \frac{RW_o^2}{2}\left[\frac{6X_e}{5} + \frac{V_e}{3}\rho^2\right] \tag{17}$$

It is noted that equation (17) relating $\rho c$, $\rho d$, $\gamma$ and $\eta$ also involves the radius of curvature R, the ruled width $W_o$ and the ruled height $$H_a(\rho = \frac{H_a}{W_a})$$

of the grating. Consequently, equation (4) will be satisfied if, for a radius of curvature R, the positions of the image and object points are given by the generalized focusing equation $T + T' = e$ specified in my copending application and if further the value of the number $n$ of lines/mm, entering into the calculation of the preceding equation, is equal to the nominal interline spacing of the helographic grating such as defined by $\sigma$.

Since the coefficients $D_{04}$, $D_4$, $D_{22}$ and $D_{02}$ involved in the right-hand term of (17) are proportional to $$\frac{m\lambda}{\lambda_o},$$

equation (17) is thus independent of the wavelength used, and may be put into the form of equation (6):

$$\cos\gamma - \cos\eta = \Phi(\rho c, \rho d, \gamma, \eta) \tag{18}$$

Under these conditions, it is seen that to determine the positioning parameters of the recording point $C$ and $D$, there are only two available equations namely, equations (10) and (18). Thus, two available parameters remain. These remaining parameters may be used to satisfy the stigmatism condition by cancelling the terms of the first order of the equation $\delta F/\delta h = 0$, i.e., by satisfying the following condition based upon equation (7):

$$\cos\gamma - \cos\eta = \rho_c - \rho_d + \frac{\lambda_o}{m\lambda}\left[\frac{1}{e} + \frac{1}{e'}-(\cos\alpha + \cos\beta)\right] \tag{19}$$

In this equation, $e$, $e'$, $\alpha$ and $\beta$ are the values associated with the selected mounting in which the values have been determined from the equation $T + T' = e$. It will be noted that the last two equations are in fact equivalent to a single one, as in equation (8), of the form:

$$\Phi'(\rho_c, \rho_d, \gamma, \eta) = \frac{\lambda_a}{m\lambda} \left[ \frac{1}{e} + \frac{1}{e'} - (\cos\alpha + \cos\beta) \right] = f(\lambda) \quad (20)$$

This basic equation which follows from the method herein used to satisfy equations (4) and (5) in the case of large aberrations is of very great practical interest. However, two cases should be distinguished, first, those in which $f(\lambda)$ is a constant and second, those in which $f(\lambda)$ is not a constant but in fact varies significantly over the spectral range of interest.

1. the particular case of $f(\lambda) =$ constant.

Considering a mounting with simple rotation of the grating, satisfying the condition $T + T' = e$ described in my copending application and having a radius of curvature R, a given value of $n$ and a given effective ruled surface $W_o H_o$ and angles $\alpha$ and $\beta$ of incidence and diffraction such that for the holographic grating the coefficient $q$ defined in the following equation may be considered as constant over a very wide spectral range:

$$\frac{1}{e} + \frac{1}{e'} - (\cos\alpha + \cos\beta) = q (\sin\alpha + \sin\beta), \quad (21)$$

the second condition relative to the position parameters of C and D is then expressed as $\Phi' = qn\lambda_o$ and is independent of the wavelength $\lambda$ in the spectral range under consideration. An important improvement may therefore be made in mountings of my copending application by the use of such a halographically formed grating since without greatly modifying the performance in resolution, it is possible to increase the luminosity by eliminating intensity losses due to astigmatism.

By utilizing the two remaining position parameters it is possible to compensate for the odd order terms by cancelling the coma terms for a given wavelength $\lambda^*$ (equal to $\lambda_i$ or $\lambda_f$ or different therefrom). The cancellation of these two coma terms is achieved as follows:

$$C_{03} = \frac{-m\lambda}{\lambda_o} D_{03} \quad (22)$$

$$C_{21} = \frac{-m\lambda}{\lambda_o} D_{21} \quad (23)$$

The choice of $\lambda^*$, determined by successive approximations, depends, for each considered mounting on the variations in coefficients $C_{03}$ and $C_{21}$ as a function of $\lambda$. One will of course choose the value of $\lambda^*$ which minimizes, for the spectral range under consideration, the quantities:

$C_{03} - C_{03}(\lambda^*)$ and $C_{21} - C_{21}(\lambda^*)$

2. $f(\lambda)$ is not a constant

In this case, equation (10) again represents the first condition to be satisfied, and the second condition $\Phi' = q'n\lambda_o$ is established by satisfying equation (7') for the two wavelengths $\lambda_i$ and $\lambda_f$, the coefficient $q'$ of equation (7') having the value:

$$q' = \frac{(\cos\alpha_f + \cos\beta_f) - (\cos\alpha_i + \cos\beta_i)}{mn(\lambda_i - \lambda_f)} \quad (24)$$

Cancellation of the two terms may be effected as in the previous case, see equations (22) and (23).

Alternatively, one may define the first condition for the position parameters by equation (10), the second condition by equation (18), the third condition by equation (19), and the fourth condition by a combination of equations (22) and (23), i.e.:

$$D_{03} - D_{21} = \frac{\lambda_o}{m\lambda} (C_{21} - C_{03}) \quad (25)$$

Still further, for large $2\theta$ values corresponding to values of $$\frac{\lambda_o}{m\lambda} i\, C_{21} > 1$$

the contribution of the two coma terms to image broadening can be cancelled by substituting, as the fourth condition defined by equation (25) above, the following:

$$(C_{03} + \frac{m\lambda}{\lambda_o} D_{03})^2 + \rho^2(\rho^2 + 5)(C_{21} + \frac{m\lambda}{\lambda_o} D_{21})^2 = 0 \quad (26)$$

To explain the last two alternatives, it is pointed out that gratings according to the present invention, which are formed by halographic techniques, involves so positioning the point light sources C and D as to improve the optical performance of mountings constructed according to my copending application. Briefly stated the mountings of my copending application involve (1) locating a point in the image space for which the deformation of the wavefront aberration from the corresponding reference sphere is a minimum, and (2) introducing a change of focus in order to minimize the aberrations over all the exit pupil. Mathematically, this technique involves determining the object and image distances in such a way that the amount of aberrations may be simply given by $AW + BW^2 + O'(w,h)$ where the third term represents high order aberrations. (1) above involves a choice of the ruled area of the grating such that these high order aberrations may be neglected to give the position of the maximum intensity of the diffracted ray of wavelength $\lambda n$ which will not appear in the direction given by the dispersion formula. (2) involves a second order focusing condition in which a defect of focus balances the fourth order aberration terms.

The optimum value of the ruled area and the required defect of focus are deduced either from an appropriate expression of Strehl's criterion or on the basis of a quality factor, dependent upon the magnitude of the wavefront error relative to wavelength. The quality factor involves a mean value of the radius of gyration of the image spot diagram, the intensity distribution being used as a weighting factor.

The optical performance of such gratings could be improved according to the present invention either by correlating each aberration term to the wavefront deformation and to determine solutions for which each aberration term is made equal to zero, or to correlate each aberration term to image broadening and then using optical criterions, to minimize the contribution of these aberration terms to such broadening.

The last two special cases above relate to this latter technique, i.e. those involving equation (10), equation (18), equation (19) and equation (25) or equation (26).

Aspherical Gratings

Different writers have theoretically studied the case of ruled gratings on ellipsoidal or toroidal surfaces with a view to obtaining a correction of astigmatism. As with spherical ruled gratings having a non constant interline spacing, the astigmatism is corrected in a point and from the optical point of view all solutions are inferior than that resulting from the use of a classical concave ruled grating, the source being focused by a toroidal mirror creating for the grating an astigmatic source, the astigmatism of which is opposite to that given by the grating. Further, of course, the making of ruled aspherical gratings faces many very difficult technological problems which, even under the hypothesis that solutions could be found, would lead to substantial increase in the cost of such gratings. On the other hand, the holographic method does not face the same technological difficulties since at the present time excellent toroidal and ellipsoidal mirrors can be made under favorable conditions.

A non limiting example proposes therefore the use of toroidal mirrors operating at magnification equal to 1. It is known that such a mirror may be stigmatic even for large angles of incidence which presents a certain advantage for the extreme ultraviolet range, whereby the optical surfaces must be used in grazing incidence for increasing the reflective power. A toroidal halographic grating provided according to the present invention would therefore be particularly appropriate for grazing incidence mountings which are more and more used for research and which may open a new field of industrial applications in particular in the grading of steels. A toroidal halographic grating is stigmatic for a wavelength such as:

$$\frac{\cos^2\alpha^r + \cos^2\beta^r}{2} = \frac{R_r}{R_h}$$

(stigmatic condition for the mounting operating with magnification equal to one). Since with grazing incidence the variations of $f(\lambda)$ are considerable, the invention provides to make by holography such a phase variation on the aperture that it compensates for deformations of the phase of the incident wave, and more particularly the deformations of astigmatic type by using according to the actual cases considered, either a point source and a second astigmatic source, or two astigmatic sources. Referring to the additivity property of aberrant optical paths and to the compensation for aberrations by displacement of the reference sphere, it is proposed to cause to interfere at the surface of the mirror, not two spherical wave surfaces, but either one spherical wave surface and one aspherical wave surface or two aspherical waves surfaces. This is easily to be effected in practice namely for making an astigmatic source, it is possible, for example, to use the image of the given point source provided by a toroidal mirror not working in these stigmatic points. Under these conditions, the recording parameters are 5 or 6 in number in case of two astigmatic sources ($\eta$, $\gamma$, $r_c$, $r'_c$, $r_D$, $r'_D$); It is therefore clear that even with grazing incidence, very luminous and high resolution stigmatic mountings can be provided. Indeed, having extra parameters available, it is possible to correct the astigmatism for two wavelengths, whereby two supplementary points of correction can be obtained from the recording conditions of the hologram. This invention is important in more than one way. In fact the obtaining of stigmatic diffracted images opens the way to making "crossed" mountings which enable total separation of the orders irrespective of the wavelength without needing to use the method of eliminating lower orders by a reflective of an optical surface at an angle such that the reflective power of the wavelengths associated with the angle of incidence is to small too be viewed.

In particular such a mounting could be specially adapted to Synchroton sources for which the number of photons emitted decreases with increasing wavelength and for which a separation of the orders is absolutely necessary, the source being spectrally continuous.

In conclusion, an important contribution to the focusing problem of such holographic gratings is made, since prior to the present invention the solutions proposed for positioning the recording points were very limited and did not lead to the provision of gratings which could be used in performing mountings with mere rotation of the grating. The invention is moreover not limited to the above examples. Thus, it is possible to provide conditions such that at least one of the point sources is virtual relatively to the surface, i.e., one at least of the point sources whether astigmatic or not, may be placed behind the grating. In other words, practically speaking, the interference phenomenon may be created with converging instead of diverging waves, the points of convergence being located behind the support of the grating. In this case one must of course use a conventional lens system for starting with given real point sources, make an image which could be focused behind the support of the grating. In these circumstances, one must in the calculation of $F_2$ bring into play the aberration of this focusing lens system.

What is claimed is:

1. The method of making a monochromator using a concave, reflective holographic grating, which comprises the steps of:

a. determining the physical parameters of the monochromator by using a concave classical reflective diffraction grating having straight, parallel lines which are equidistantly spaced to provide a line density $1/n$, a height $H_0$ and a width $W_0$, the monochromator having fixed entrance and exit slits with the grating being mounted for rotation only with respect to said slits whereby to scan a spectral range of interest, said physical parameters being the positions of said entrance and exit slits with respect to the intersection of their optical axes at the center of the reflective surface of said grating, and said physical parameters being selected to provide a defect of focus which balances second order aberration terms excepting astigmatism whereby the partial derivative $\partial F_1/\partial w$ is equal to zero, $F_1$ being the optical path associated with said classical grating and $w$ and $h$ being Cartesian coordinates with respect to said center of the grating extending respectively perpendicular and parallel to said grating lines;

b. holographically forming a grating by locating two point sources of monochromatic light of wavelength $\lambda_o$ in the $w$ plane passing through the center of a holographic blank having the concavity of said classical grating, such that said point sources are located by four position parameters which are the respective distances $rc$ and $rd$ of said point sources from said center of the holographic blank and the angles $\gamma$ and $\eta$ which lines from such point sources to said center respectively make with a line passing through such center and normal to said holographic blank, said four position parameters being established by four simultaneous equations the first of which is $\sin\eta - \sin\gamma = n\gamma_0$ and the remaining three of which are determined on the basis of $$\frac{\partial F_2}{\partial w} = 0$$

and $$\frac{\partial P}{\partial h} = \frac{\partial F_1}{\partial h} + \frac{\partial F_2}{\partial h} = 0$$

and by cancelation of the two principal coma terms associated with the coma contribution of said point sources, $F_1$ as before being the optical path associated with said classical grating and $F_2$ being the optical path relative to said entrance and exit slits associated with said holographically formed grating; and c. substituting the holographically formed grating for said classical grating.

2. The method as defined in claim 1 wherein said classical grating and said holographic blank are spherical, having a radius of curvature R; the condition $$\frac{\partial F_2}{\partial w} = 0$$

establishing the relation:

$$\frac{m\lambda}{\lambda_o}(\rho_c \cos^2\gamma - \rho_d \cos^2\eta) = \frac{m\lambda}{\lambda_o}(\cos\gamma - \cos\eta) + \frac{RW_o^2}{2}\left[\frac{6}{5}X_e + \frac{V_e\rho^2}{3}\right]$$

where:
$m$ is the order of diffraction
$\lambda$ is the wavelength of use
$\rho_c = R/r_c$
$\rho_d = R/r_d$ $e = r/R$ where $r$ is the distance along the optical axis from the entrance slit to the center of the grating
$e' = r'/R$ where $r'$ is the distance along the optical axis from the exit slit to the center of the grating
$\rho = 1/e$
$X_e = D_{04} + D_4$ where $D_{04}$ and $D_4$ are the aberration coefficients of $w^4$ and $h^4$ respectively due to said point sources, and
$V_e = D_{22} + 2D_4$ where $D_{22}$ and $D_4$ are the aberration coefficients of $w^2h^2$ and $h^4$ respectively due to said point sources;
the condition $$\frac{\delta P}{\delta h} = 0$$

establishes the relation:

$$\cos\gamma - \cos\eta = \rho_c - \rho_d + \frac{\lambda_o}{m\lambda}\left[\frac{1}{e} + \frac{1}{e'}(\cos\alpha + \cos\beta)\right]$$

where:
$\alpha$ is the angle between the optical axis from the entrance slit to the grating and the line normal to the center of the grating, and $\beta$ is the angle between the optical axis from the exit slit to the grating and said line.

3. The method as defined in claim 2 wherein said relations are combined in the form:

$$\frac{\lambda_o}{m\lambda}\left[\frac{1}{e} + \frac{1}{e'}(\cos\alpha + \cos\beta)\right] = \lambda_o f(\lambda)$$

where $f(\lambda) = qn\lambda_o$, $q$ being a constant such that:

$$\frac{1}{e} + \frac{1}{e'}(\cos\alpha + \cos\beta) = q(\sin\alpha + \sin\beta)$$

4. The method as defined in claim 2 wherein said relations are combined in the form $$\frac{\lambda_o}{m\lambda}\left[\frac{1}{e} + \frac{1}{e'}(\cos\alpha + \cos\beta)\right] = \lambda_o f(\lambda)$$

where $f(\lambda) = q'n\lambda_o$, $q'$ having the value:

$$q' = \frac{(\cos\alpha_f + \cos\beta_f) - (\cos\alpha_i + \cos\beta_i)}{mn(\lambda_i - \lambda_f)} \qquad (24)$$

where $\lambda_i$ and $\lambda_f$ are two wavelengths for which astigmatism is corrected.

5. The method as defined in claim 4 wherein the two principal coma terms are corrected according to:

$$C_{03} = \frac{-m\lambda^*}{\lambda_o}D_{03}, \text{ and}$$

$$C_{21} = \frac{-m\lambda^*}{\lambda_o}D_{21}$$

where $C_{03}$ and $C_{21}$ respectively are the aberration coefficients of $H^3$ and $W^2H$ associated with the classical grating and $D_{03}$ and $D_{21}$ respectively are the aberration coefficients of $H^3$ and $W^2H$ associated with said point sources, and $\lambda^*$ is a wavelength within the spectrum of interest.

6. The method as defined in claim 3 wherein the two principal coma terms are corrected according to:

$$C_{03} = \frac{-m\lambda}{\lambda_o} D_{03}, \text{ and}$$

$$C_{21} = \frac{-m\lambda}{\lambda_o} D_{21}$$

where $C_{03}$ and $C_{21}$ respectively are the aberration coefficients of $H^3$ and $W^2H$ associated with the classical grating and $D_{03}$ and $D_{21}$ respectively are the aberration coefficients of $H^3$ and $W^2H$ associated with said point sources, and $\lambda^*$ is a wavelength within the spectrum of interest.

7. The method according to claim 2 wherein cancellation of the two principal coma terms is effected as follows:

$$D_{03} - D_{21} = \frac{\lambda_o}{m\lambda} (C_{21} - C_{03})$$

where $C_{03}$ and $C_{21}$ respectively are the aberration coefficients of $H^3$ and $W^2H$ associated with the classical grating and $D_{03}$ and $D_{21}$ respectively are the aberration coefficients of $H^3$ and $W^2H$ associated with said point sources, and $\lambda^*$ is a wavelength within the spectrum of interest.

8. A monochromator constructed according to the method of claim 1.

9. A monochromator constructed according to the method of claim 2.

10. A monochromator constructed according to the method of claim 3.

11. A monochromator constructed according to the method of claim 4.

12. A monochromator constructed according to the method of claim 5.

13. A monochromator constructed according to the method of claim 6.

14. A monochromator constructed according to the method of claim 7.

* * * * *